July 19, 1960 A. L. GRIFFIN ET AL 2,945,341
PARKING METER
Filed Sept. 17, 1956 3 Sheets-Sheet 1

Anthony L. Griffin
Earl G. Chetwynd
INVENTORS,

BY *[signatures]*
Attorneys

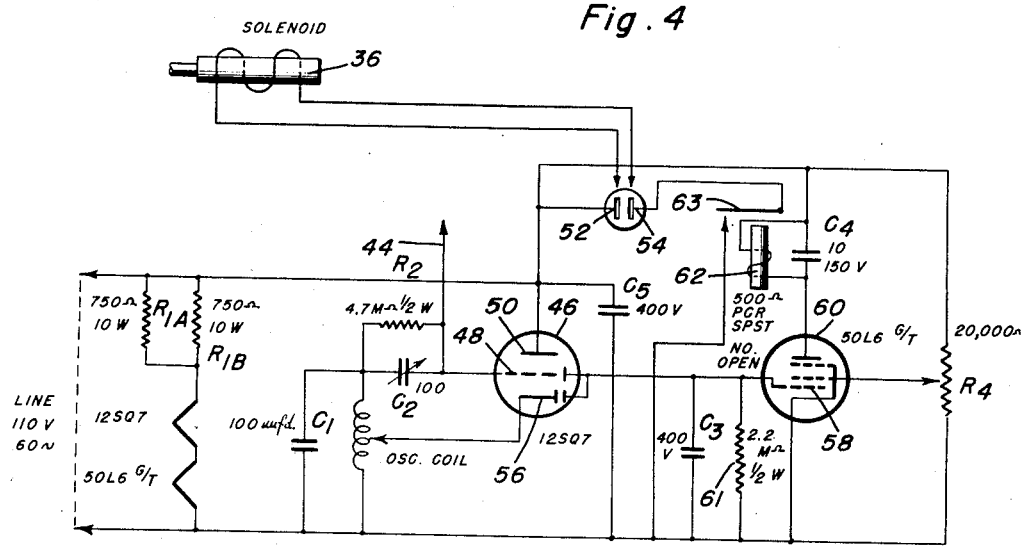

July 19, 1960 A. L. GRIFFIN ET AL 2,945,341
PARKING METER
Filed Sept. 17, 1956 3 Sheets-Sheet 3

Anthony L. Griffin
Earl G. Chetwynd
INVENTORS

United States Patent Office 2,945,341
Patented July 19, 1960

2,945,341
PARKING METER

Anthony L. Griffin, 107 Davidson St., Amsterdam, N.Y., and Earl G. Chetwynd, 6 Steele Ave., Gloversville, N.Y.

Filed Sept. 17, 1956, Ser. No. 610,170

2 Claims. (Cl. 58—142)

This invention relates to a parking meter and more particularly to a device adapted to be actuated upon approach of a vehicle and upon movement of the vehicle away from the parking meter.

The primary object of the present invention resides in the provision of a parking meter having means for automatically setting the meter for operation upon the approach of a vehicle and further having means for resetting a clock work mechanism to a zero position as the vehicle drives away.

The construction of this invention features the use of a capacity operated relay for actuating a solenoid which controls a gear shift mechanism associated with a clockwork mechanism or timer which is coin controlled so that the clockwork mechanism may be set for use as a vehicle approaches and is returned to a zero setting as the vehicle drives away.

Still further objects and features of this invention reside in the provision of a clockwork mechanism which employs a transistorized and printed circuit so arranged that the entire mechanism may be mounted conveniently within the parking meter.

These, together with the various ancillary objects and features of the invention which will become apparent as the following description proceeds, are attained by this parking meter, a preferred embodiment of which has been illustrated in the accompanying drawings, by way of example only, wherein:

Figure 4 is a schematic wiring diagram of the invention;

Figure 5 is a plan view of the various parts utilized in the circuits of the capacitor operated relays;

Figure 6 is a schematic diagram illustrating the relative arrangements of parts of the oscillator coil.

Figure 1:
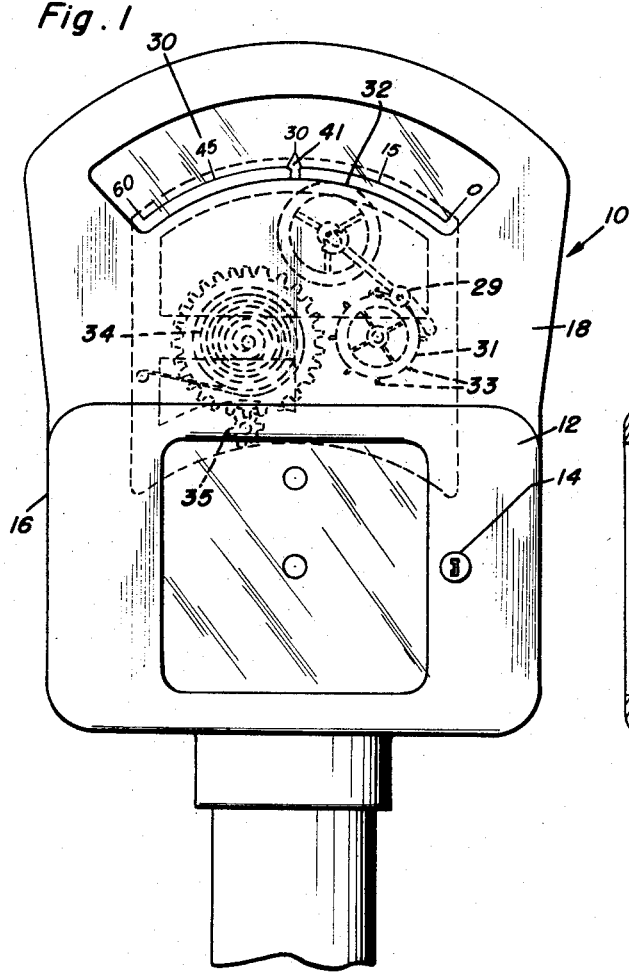
Figure 1 is a front elevational view of the parking meter comprising the present invention.
Figure 2:
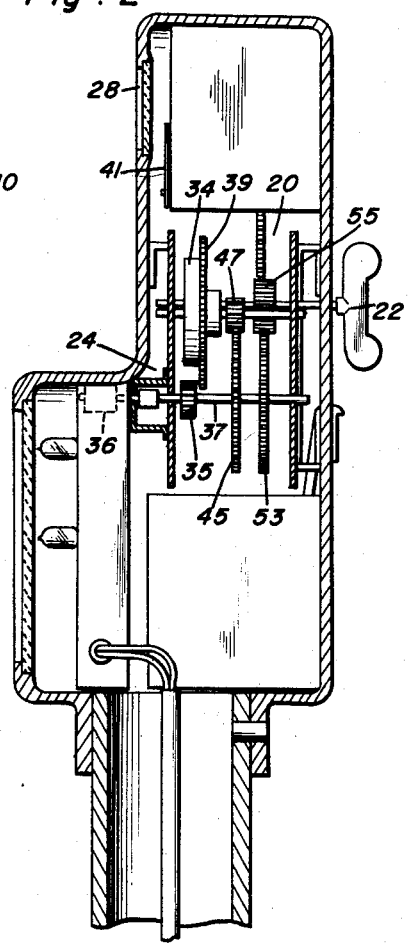
Figure 2 is a vertical sectional detail view illustrating the arrangement of parts incorporated in the parking meter.
Figure 3:
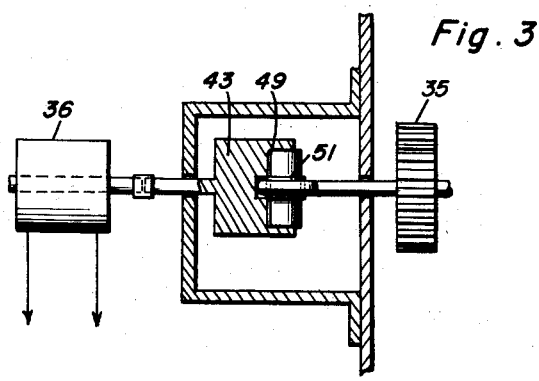
Figure 3 is a sectional detail view of the solenoid actuated canceller components.

With continuing reference to the accompanying drawings wherein like reference numerals designate similar parts throughout the various views, reference numeral 10 generally designates the parking meter comprising the present invention which has a door 12 adapted to be closed by a key actuated lock 14 which door is hinged as at 16 to the rest of the housing 18 of the parking meter. The parking meter is preferably of the coin controlled type having a conventional coin actuation mechanism, not shown, for actuating a conventional clockwork mechanism or timer 20. The timer 20 has an actuating shaft controlled by a winding key 22 and the actuating shaft has a canceller mechanism 24 associated therewith whereby the clockwork mechanism 20 can be reset to zero upon release of the canceller mechanism 24. The timer 20 causes movement of a visual signal 41 to a position in alignment with a glass window 28 which has suitable indicia 30 thereon as is conventional for indicating the amount of unexpired time remaining to the person parking.

Figure 7:
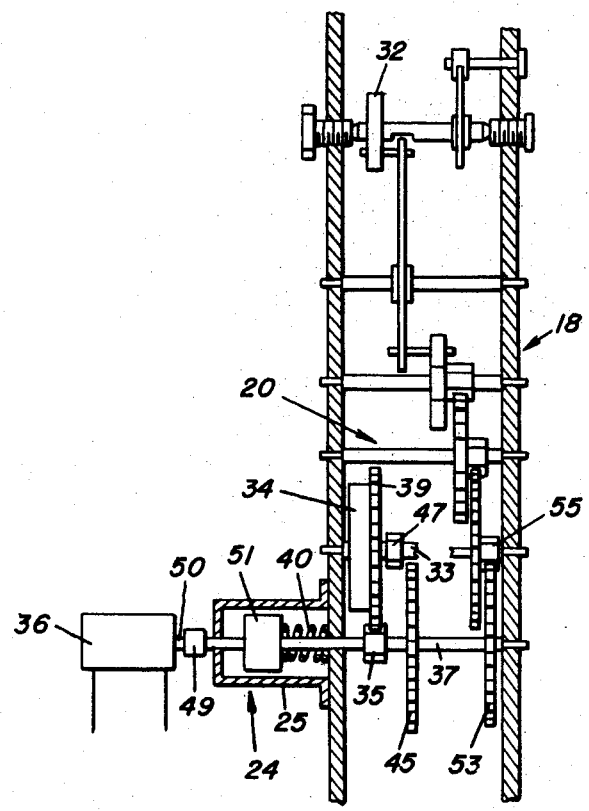
Figure 7 is a sectional detail view illustrating the details of the gear train utilized.

The timer 20 includes conventional gearing which drives escapement 32. The essence of the invention lies particularly in the variable gear means between main spring 34 fixed to main spring shaft 33 and gear 55 which drives escapement 32 through conventional means as denoted. Fixed to the main spring shaft 33 is a large gear 39 and a small gear 47. A small gear 35 and a large gear 45 fixed to shaft 37 are adapted to engage the gears 39 and 47 respectively. The gear 53 is also fixed to shaft 37 and is engaged with gear 55 forming part of the conventional gear transmission train for driving escapement 32. It is apparent that the rate of energy dissipation of the main spring 34 is determined by the gear ratios between the main spring 34 and the escapement 32. In the normal clock operation, as illustrated in Figure 7, the larger gear 39 on the main spring shaft 33 is engaged with the smaller gear 35 on shaft 37 for driving gears 53 and 65 and escapement 32. With the gearing positioned as shown in Figure 7, the main spring 34 will run down at a normal rate. When an automobile leaves a parking space adjacent the meter 10, it is desired to run down the main spring 34 at an accelerated rate. Accordingly, it is necessary to change the gear ratio between the main spring 34 and escapement 32. Therefore, the larger gear 45 on shaft 37 is provided to engage the smaller gear 47 on main spring shaft 33. It will be apparent that the main spring energy will be dissipated at an accelerated rate when the smaller main spring shaft gear 47 is utilized to drive the larger gear 45.

In order to effect the engagement of gears 39 and 35 or gears 47 and 45, the shaft 37 is made longitudinally slidable. A canceller or shifting mechanism 24 includes a compartment 25 affixed to the housing 18. The shaft 37 extends into the compartment 25 and is operatively engaged with a thrust bearing 51. A coil spring 41 concentrically surrounds the shaft 37 between the thrust bearing 51 and housing 18. The shaft 37 extends to a coupling 49 which connects the shaft 37 to an armature 50 of a solenoid coil 36. The actuating or control means for the solenoid 36 are to be more particularly described below. For the present, it will suffice to state that when an automobile approaches the parking space and meter, the solenoid coil 36 will be energized to urge the armature 50 and slidable shaft 37 to the right (the position illustrated in Figure 7). It will be seen that when the solenoid coil 36 is energized the large gear 39 on the main spring shaft 33 will be engaged with the small gear 35 on the shaft 37 and the escapement 32 will be driven at a normal rate. When the automobile leaves the parking space, the solenoid coil 36 will become de-energized and the coil spring 40 will urge the thrust bearing 51 and shaft 37 to the left so as to disengage the gears 39 and 35 and engage the small gear 47 of the main spring shaft 33 with the large gear 45 on the shaft 37. The energy of the main spring 34 will then be dissipated at an accelerated rate through the timer mechanism 20 to the escapement 32. The accelerated rate, for example, may dissipate the energy of the main spring 34 in a matter of seconds where the normal rate may consume several hours. The coupling 49 connects the solenoid armature 50 to the shaft 37 while the thrust bearing 51 is provided to allow the shaft 37 to revolve. The gear teeth utilized are high speed shifting gear teeth of a tapered construction for causing easy meshing of the gears. It is to be noted that the gear 53, which is fixed to the shaft 37, will move with the shaft 37 but always remain engaged with the gear 55 due to the width of the gear 55.

The solenoid 36 is provided with a signal for excitation thereof as a vehicle approaches the parking meter due to the fact that an alarm wire as indicated at 44 acts as one capacitor plate, the other capacitor plate of the system being the vehicle itself and the approach of the vehicle serves to increase the bias on the tube or transistor 46 to the extent that the grid 48 thereof permits the tube to fire. Upon firing of the tube the output is such that the output which is applied on the cathode 50 of the tube serves to provide a potential across contacts 52 and 54 across which the solenoid 36 is connected. As the vehicle pulls away the tube 46 will no longer fire. The potential between the plate 56 and grid 48 on the tube or transistor 46 is applied as a grid bias on the grid 58 of a tube 60 which controls a relay 62 of such a nature that when the potential between the grid 48 and the plate 50 is such that the tube 46 fires, the tube 60 will fire to actuate the relay 62 which in turn opens the circuit to the contacts 52 and 54 and maintaining the solenoid 36 energized.

However, as the vehicle drives away, the tube 46 no longer fires and the potential on the grid 58 of the tube 60 is no longer sufficient to support the firing of the tube 60 whereby the relay 62 opens the circuit to the contacts 52 and 54 to which the solenoid 36 is connected.

In operation, the relay is actuated by the plate current flowing through the tube 60, but is normally opened because the control grid is held sufficiently negative to keep the plate current low. The tube 46 is a Hartley oscillator, thus producing strong oscillations as long as the alarm wire is clear of foreign objects, that is objects having capacitance to ground. This oscillatory voltage is picked up and rectified by the diode section of the tube and applied to the control grid of tube 60 as a negative bias.

Upon approach of a vehicle, the oscillation is weakened causing a reduction of diode current through the resistor 61. The control plate current rises to a value which is high enough to pull in the relay armature 63 of the relay 62. This functions to operate the controlled solenoid 36.

The relay 62 when energized acts as an automatic switch that actually starts and stops the solenoid 36.

A scramble wound coil as shown in Figure 6 and indicated by reference numeral 77 is an oscillator coil scramble wound and functions the same way as the alarm wire 44 and may be used alternatively therefor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A parking meter comprising a housing, a clockwork mechanism in said housing for actuating a signal, said clockwork mechanism including a main spring and escapement means, variable ratio gear transmission train means connecting said main spring and escapement means for varying the rate of energy escape from said main spring, said gear transmission train means including a small gear on said main spring shaft, a large gear on said main spring shaft, a large gear on a driven shaft adapted to engage said small spring shaft gear, a small gear on said driven shaft adapted to engage said large spring shaft gear and means for moving said driven shaft so that a selective gear ratio engagement is established.

2. The combination of claim 1 wherein said last mentioned means include a solenoid coil located proximate said driven shaft and actuating means connected to said coil for actuating said coil to longitudinally move said driven shaft.

References Cited in the file of this patent

UNITED STATES PATENTS

| | | |
|---|---|---|
| 2,251,407 | Johns | Aug. 5, 1941 |
| 2,535,472 | Wood | Dec. 26, 1950 |
| 2,543,032 | Laviana | Feb. 27, 1951 |
| 2,575,650 | Alexander | Nov. 20, 1951 |
| 2,591,402 | Campbell | Apr. 1, 1952 |
| 2,610,683 | Beiser | Sept. 16, 1952 |